US009896119B2

(12) United States Patent
Lin et al.

(10) Patent No.: US 9,896,119 B2
(45) Date of Patent: Feb. 20, 2018

(54) STEERING WHEEL, STEERING WHEEL CONTROL SYSTEM, AND METHOD OF UNFOLDING STEERING WHEEL

(71) Applicant: HON HAI PRECISION INDUSTRY CO., LTD., New Taipei (TW)

(72) Inventors: Po-Heng Lin, New Taipei (TW); Chen-Wei Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 120 days.

(21) Appl. No.: 14/858,081

(22) Filed: Sep. 18, 2015

(65) Prior Publication Data

US 2016/0083002 A1    Mar. 24, 2016

(30) Foreign Application Priority Data

Sep. 22, 2014   (TW) .............................. 103132682 A

(51) Int. Cl.
| | |
|---|---|
| *B62D 1/06* | (2006.01) |
| *B62D 1/10* | (2006.01) |
| *B62D 1/08* | (2006.01) |
| *B62D 1/04* | (2006.01) |

(52) U.S. Cl.
CPC ................ *B62D 1/06* (2013.01); *B62D 1/04* (2013.01); *B62D 1/08* (2013.01); *B62D 1/10* (2013.01)

(58) Field of Classification Search
CPC ... B62D 1/04; B62D 1/06; B62D 1/08; B62D 1/10
See application file for complete search history.

(56) References Cited

U.S. PATENT DOCUMENTS 1,285,737 A * 11/1918 Kissling .................. B62D 1/10
74/555

FOREIGN PATENT DOCUMENTS

| FR | 375046 A | * | 6/1907 | ............... B62D 1/06 |
| FR | 827381 A | * | 4/1938 | ............... B62D 1/10 |
| GB | 490959 A | * | 8/1938 | ............... B62D 1/10 |
| JP | 2004345375 A | * | 12/2004 | ............... B62D 1/06 |

* cited by examiner

*Primary Examiner* — Thomas C Diaz
(74) *Attorney, Agent, or Firm* — ScienBiziP, P.C.

(57) ABSTRACT

A steering wheel can include a rotation shaft, a hub, a periphery ring, and at least one arm. The latching portion is coupled to the rotation shaft. The hub is sleeved on the rotation shaft, and slidable along the rotation shaft. The button is positioned on the hub and configured to cooperate with the latching portion. The latching portion is configured to detachably couple the hub. The button is configure to push the latching portion to detach from the hub when being pressed. The periphery ring is made of flexible material. The at least one arm is pivoted to the hub and coupled to the periphery ring. The at least one arm is configured to be folded when the hub slides along the rotation shaft.

17 Claims, 10 Drawing Sheets

STEERING WHEEL, STEERING WHEEL CONTROL SYSTEM, AND METHOD OF UNFOLDING STEERING WHEEL

FIELD

The subject matter herein generally relates to steering wheels, and particularly to a foldable steering wheel, a steering wheel control system, and a method of unfolding steering wheel.

BACKGROUND

Cars are important means of transportation nowadays. A steering wheel can be provided in a car for adjusting driving directions. The steering wheel can be substantially circular and positioned in front of a seat.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
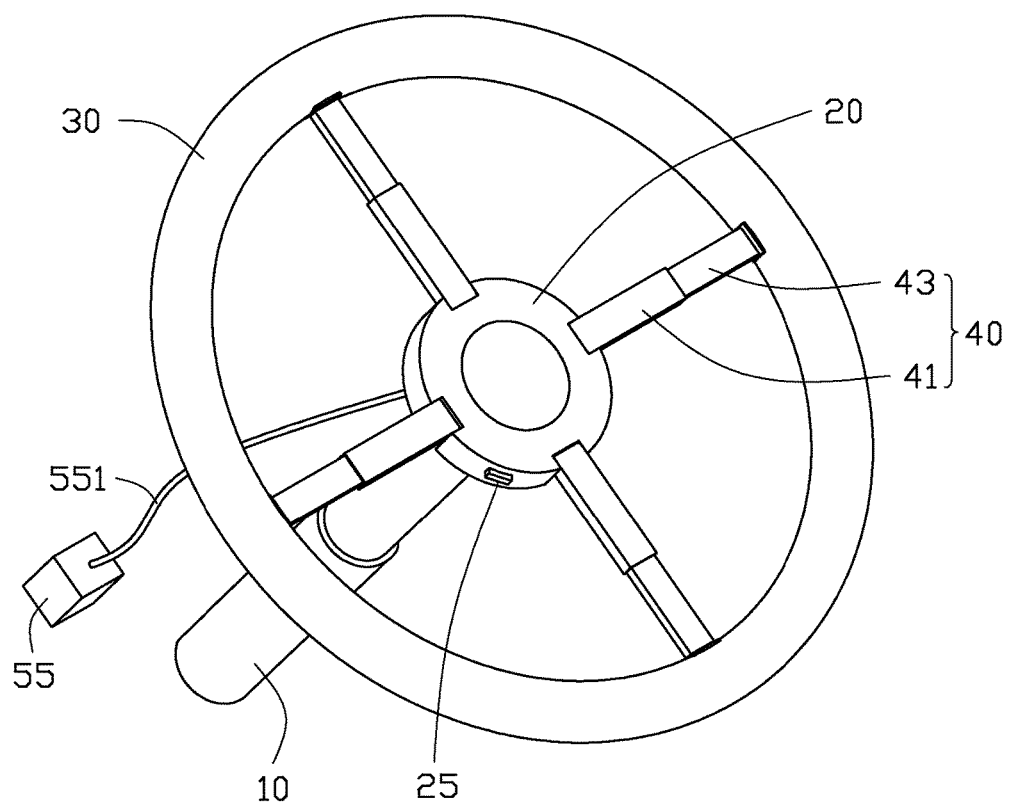
FIG. 1 is an isometric view of a steering wheel having an air pump, in a first configuration.

It will be appreciated that for simplicity and clarity of illustration, where appropriate, reference numerals have been repeated among the different figures to indicate corresponding or analogous elements. In addition, numerous specific details are set forth in order to provide a thorough understanding of the configurations described herein. However, it will be understood by those of ordinary skill in the art that the configurations described herein can be practiced without these specific details. In other instances, methods, procedures, and components have not been described in detail so as not to obscure the related relevant feature being described. Also, the description is not to be considered as limiting the scope of the configurations described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A steering wheel is described herein. The steering wheel can include can include a rotation shaft, a hub, a periphery ring, and at least one arm. The latching portion can be coupled to the rotation shaft. The hub can be sleeved on the rotation shaft, and slidable along the rotation shaft. The button can be positioned on the hub and configured to cooperate with the latching portion. The latching portion can be configured to detachably couple the hub. The button can be configured to push the latching portion to detach from the hub upon being pressed. The periphery ring can be made of flexible material. The at least one arm can be pivoted to the hub and coupled to the periphery ring. The at least one arm can be configured to be folded in event the hub slides along the rotation shaft.

A steering wheel control system is described herein. The steering wheel control system can include a control device and a steering wheel. The steering wheel can include a rotation shaft, a hub, a periphery ring, an air pump, and at least one arm. The latching portion can be coupled to the rotation shaft. The hub can be sleeved on the rotation shaft, and slidable along the rotation shaft. The button can be positioned on the hub and configured to cooperate with the latching portion. The latching portion can be configured to detachably couple the hub. The button can be configured to push the latching portion to detach from the hub upon being pressed. The periphery ring can be made of flexible material. The air pump can be electrically coupled to the control device and in communication with the periphery ring. The at least one arm can be pivoted to the hub and coupled to the periphery ring. The control device can be configured to control the hub to slide along the rotation shaft. The at least one arm can be configured to be folded in event the hub slides along the rotation shaft.

A method of unfolding steering wheel is described herein. The method can include: sending a first identification code to the first communication unit of a control device, judging whether a storage unit of the control device pre-stores the first identification code, comparing a current number of verification defeated times stored in the storage unit with a preset number of verification defeated times pre-stored in the storage unit when the first identification code had pre-stored in the storage unit, identifying the first identification code while the current number of verification defeated times less than the preset number of verification defeated times, sending a second identification code to a second communication unit of a smart key, displaying a character and sending a third identification code when pressing or touching the character, controlling an air pump of a steering wheel to blow air into a periphery ring, wherein, the periphery ring is made of flexible material.

FIG. 1 illustrates that the steering wheel 100 in a first configuration. The steering wheel 100 can include a rotation shaft 10, a hub 20, a periphery ring 30, a plurality of arms 40, and an air pump 55. The hub 20 can be detachably sleeved on the rotation shaft 10 and can slide along the rotation shaft 10. The periphery ring 30 can be concentric with the hub 20. The plurality of arms 40 can couple the periphery ring 30 and the hub 20. The air pump 55 can be coupled to the hub 20 via a coupling tube 551, and configured to blow air into the periphery ring 30 via the coupling tube 551, the hub 20, and the arms 40. In the illustrated configuration, the rotation shaft 10 is a hydraulic support bar.

A button 25 can be movably coupled to the hub 20. Each arm 40 can include a coupling portion 41 and a sliding portion 43 coupled to the coupling portion 41. The sliding portion 43 can be partially received in the coupling portion 41 and can slide along a longitudinal direction of the coupling portion 41. The whole of the sliding portion 43 can be received in the coupling portion 41 or the most of the sliding portion 43 can be received in the coupling portion 41. Thus, a total length of the coupling portion 41 and sliding portion 43 can be adjusted. A length of the coupling portion 41 can be smaller than a height of the receiving box 300. In the illustrated configuration, a number of the arms 40 can be four. In an alternative configuration, a number of the arms 40 can be two, three, or more than four.

Figure 2:
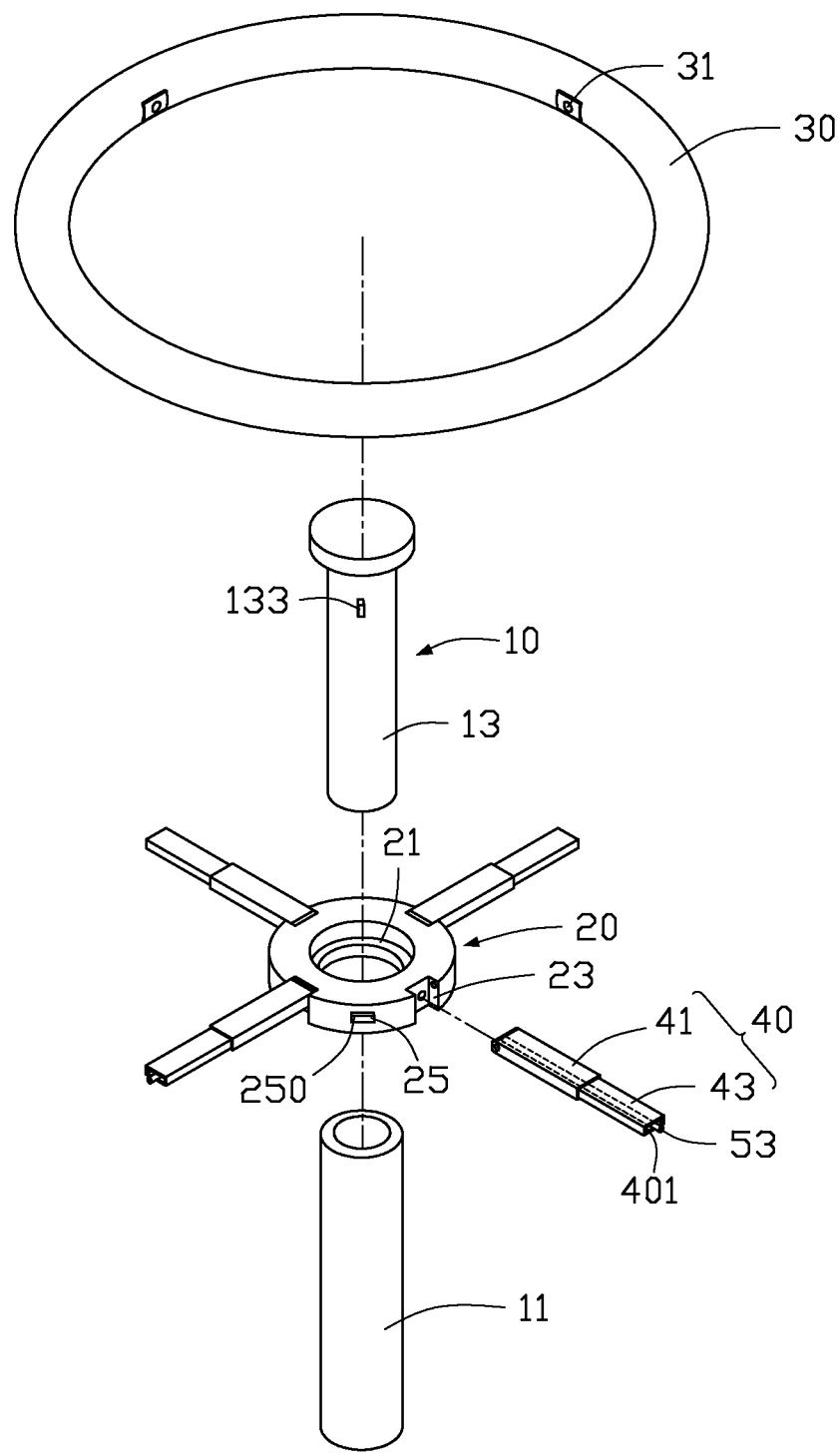
FIG. 2 is an exploded, isometric view of the steering wheel except the air pump of FIG. 1.

FIG. 2 illustrates that the hub 20 can define a receiving hole 250 and the button 25 can be movably received in the receiving hole 250. The rotation shaft 10 can include a driving portion 11 and a telescopic rod 13 coupled to the driving portion 11. The telescopic rod 13 can be substantially T-shaped. The driving portion 11 can be configured to drive the telescopic rod 13 to move. A latching portion 133 can be coupled to an outer sidewall of the telescopic rod 13. When the latching portion 133 is pressed, the latching portion 133 can be radially movable relative to the telescopic rod 13. The latching portion 133 can be made of elastic materials. The latching portion 133 can be configured to cooperate with the button 25. When the latching portion 133 is received in the receiving hole 250, the hub 20 can be positioned to the telescopic rod 13 of the rotation shaft 10. When the button 25 is pressed, the button 25 push the latching portion 133 to detach away from the receiving hole 250. Thus, the hub 20 can slide along the rotation shaft 10. In the illustrated configuration, the driving portion 11 can be a cylinder.

The hub 20 can be slidably sleeved on an end of the telescopic rod 13 away from the driving portion 11. The hub 20 can be substantially a ring and can define a stepped shaped through hole 21 along a center axis of the hub 20. The telescopic rod 13 can be inserted into the through hole 21. A longitudinal axis of the through hole 21 can be concentric with a longitudinal axis of the rotation shaft 10. A diameter of the through hole 21 can be slightly larger than a diameter of the telescopic rod 13. When the hub 20 is coupled to the telescopic rod 13, the latching portion 133 can be aligned with the button 25. When the button 25 is pressed, the button 25 can push the latching portion 133 to move inwardly. Thus, the hub 20 can be detached away from the telescopic rod 13. In an alternative configuration, the button 25 can be omitted, and then the hub 20 can be coupled to the telescopic rod 13 via a friction between the latching portion and the telescopic rod 13. When the hub 20 is pulled to move along the telescopic rod 13, the friction can be overcome and the hub 20 can be detached from the telescopic rod 13.

The hub 20 can define four receiving grooves 23 at the outer sidewall thereof. The periphery ring 30 can be hollow and made of flexible materials to be foldable. Four coupling holes 31 can be defined at an inner wall of the periphery ring 30. Opposite ends of each arm 40 can be respectively coupled to the hub 20 and the periphery ring 30. In the illustrated configuration, the periphery ring 30 can be made of plastic. Each arm 40 can define a passage 401 through the coupling portion 41 and the sliding portion 43. A branch tube 53 can be received in each passage 401 and made of flexible materials. Thus, four branch tubes 53 can be respectively received in the four passages 401 of the arms 40. A number of the branch tubes 53 can be changed according to a number of the arms 40.

An end of each coupling portion 41 away from the sliding portion 43 can be received in one of the receiving grooves 23 and pivoted to the hub 20. Thus, the passage 401 of the arm 40 can be in communication with the corresponding receiving groove 23. An end of the sliding portion 43 away from the coupling portion 41 can be coupled to the periphery ring 30 and the passage 401 can be in communication with one of the coupling holes 31.

Figure 3:
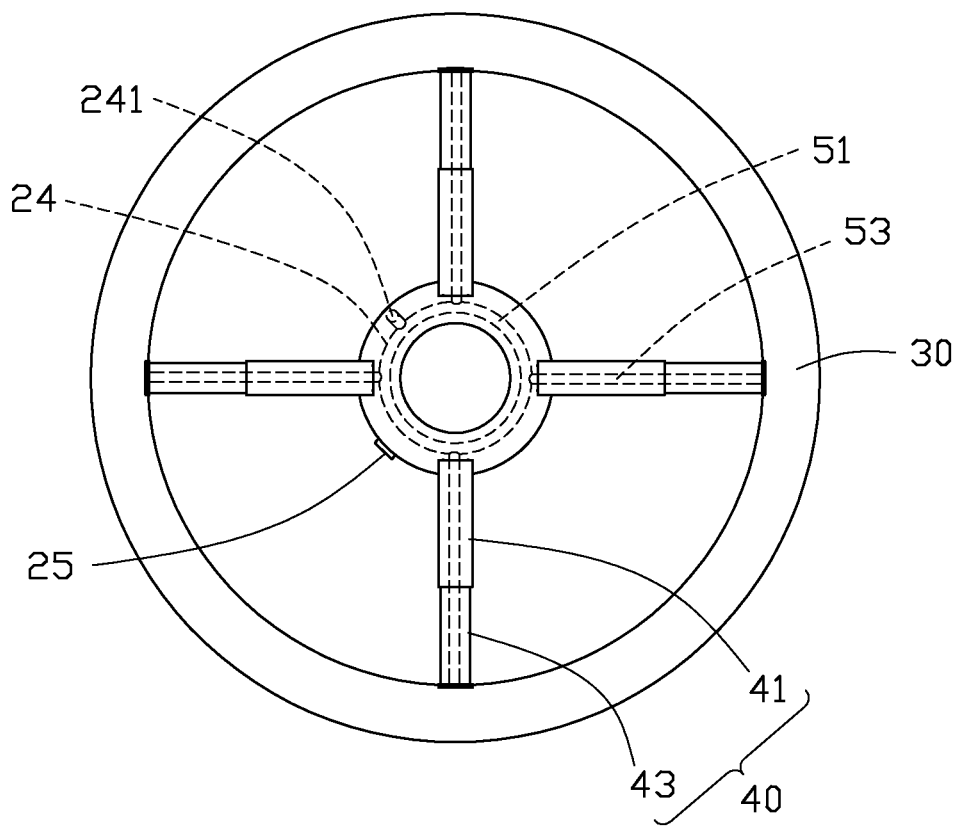
FIG. 3 is a top view of the steering wheel except the air pump of FIG. 1.

FIG. 3 illustrates that the hub 20 can define an annular channel 24 therein and the annular channel 24 can be in communication with the receiving grooves 23. Thus, the annular channel 24 can be in communication with the passages 401 of the arms 40. An opening 241 can be defined on the hub 20 and be in communication with the annular channel 24.

An air guide tube 51 can be received in the annular channel 24 of the hub 20. The air guide tube 51 can be substantially ring-shaped, and can be in communication with the opening 241 and the branch tubes 53. An end of each branch tube 53 away from the air guide tube 51 can be in communication with the corresponding coupling hole 31. The coupling tube 551 can be inserted into the opening 241 to communicate with the air guide tube 51. Therefore, the coupling tube 551 can be in communication with the periphery ring 30 via the air guide tube 51 and branch tubes 53. Thus, the air pump 55 can blow air into the periphery ring 30 via the coupling tube 551, the air guide tube 51, and branch tubes 53.

Figure 4:
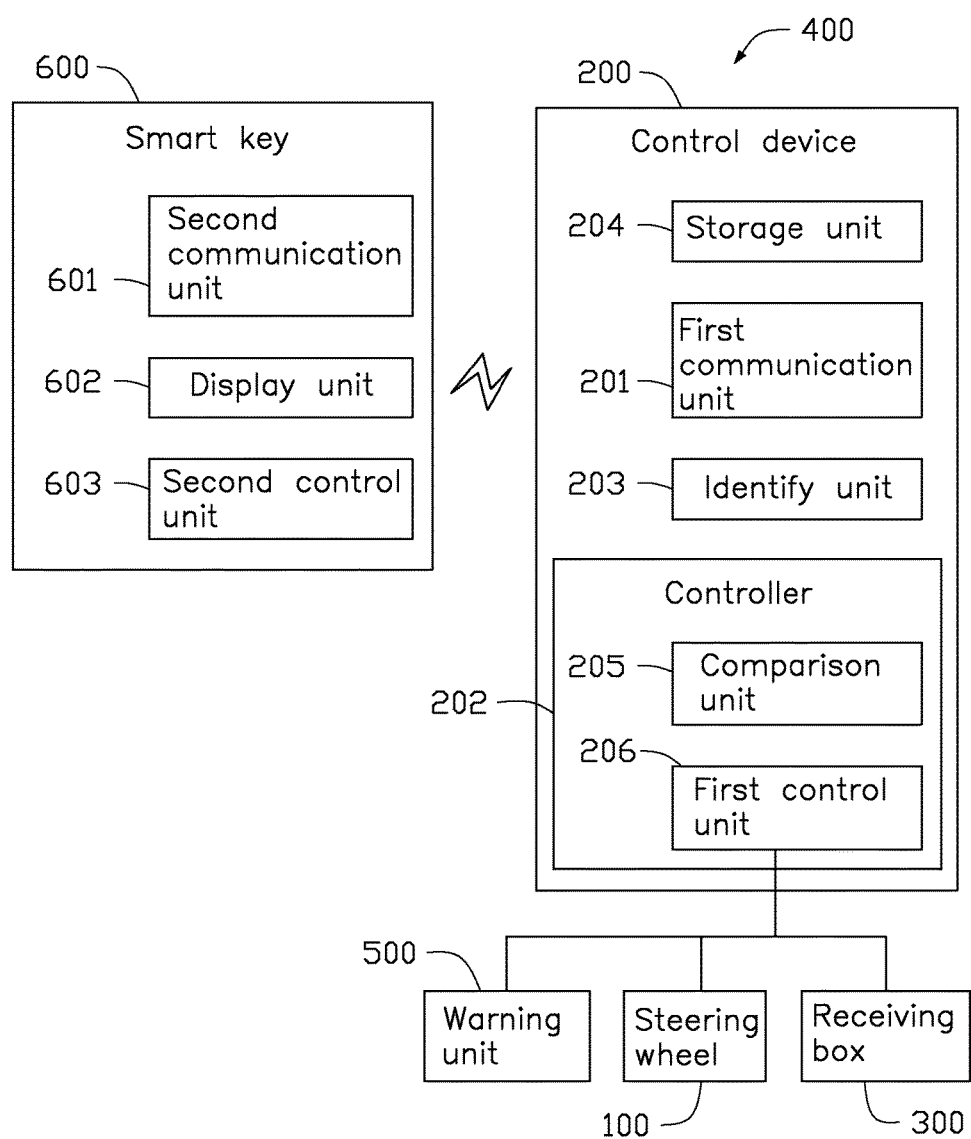
FIG. 4 is a block diagram of a steering wheel control system, in a first configuration, according to the present disclosure.

FIG. 4 illustrates a steering wheel control system 400 can include the steering wheel 100 coupled to a car (not shown), a control device 200, a receiving box 300, and a warning unit 500 electrically coupled to the control device 200. When the steering wheel 100 is not in use, the steering wheel 100 can be folded and received in the receiving box 300. The control device 200 can cooperate with a smart key 600, and configured for controlling to open the receiving box 300 and to unfold the steering wheel 100. The warning unit 500 can pre-store an alarm telephone number. The control device 200 can be further configured to control the warning unit 500 to call the telephone number. In the illustrated configuration, the alarm telephone number can be the owner's phone number. The smart key 600 can be imbedded in a portable device or other devices.

The control device 200 can include a plurality of units. The plurality of units of the control device 200 can include a first communication unit 201, a controller 202, an identify unit 203, and a storage unit 204. The controller 202 can include a comparison unit 205 and a first control unit 206. The units of the control device 200 can include separated functionalities represented by hardware or integrated circuits, or as software and hardware combinations, such as a special-purpose processor or a general-purpose processor with special-purpose firmware.

In at least one configuration, the storage unit 204 can be an internal storage system, such as a flash memory, a random access memory (RAM) for temporary storage of information, and/or a read-memory (ROM) for permanent storage of information.

In at least one configuration, the storage unit 204 can also be a storage system, such as a hard disk, a storage card, or a data storage medium. The storage unit 204 can include volatile and/or non-volatile storage devices.

In at least one configuration, the storage unit 204 can include two or more storage devices such that one storage device is a memory and the other storage device is a hard drive. Additionally, the storage unit 204 can be respectively located either entirely or partially external relative to the control device 200.

The smart key 600 can include a plurality of units. The plurality of units of the smart key 600 can include a second communication unit 601, a display unit 602, and a second control unit 603. The units of the smart key 600 can include separated functionalities represented by hardware or integrated circuits, or as software and hardware combinations, such as a special-purpose processor or a general-purpose processor with special-purpose firmware. The first communication unit 201 of the control device 200 can be wireless communication with the second communication unit 601 of the smart key 600. The first control unit 206 can be electrically coupled to the driving portion 11, the air pump 55, and the warning unit 500. The display unit 602 can be a touch screen, and/or any other component(s) or device(s) that can identify a touch operation and display contents. In the illustrated configuration, the display unit 602 can be a touch screen. The touch operations can include but not limited to slide gestures, click gestures, press gestures and/or other suitable gestures. The click gestures can include single-click gestures and double-click gestures. The click gestures can be different from the slide gestures via different pressures performed on the display unit 602.

The storage unit 204 can pre-store a preset number of verification defeated times. The first communication unit 201 can be configured to receive a first identification code send by the second communication unit 601. The identify unit 203 can be configured to judge whether the storage unit 204 pre-stores the first identification code. When the identify unit 203 judges that the storage unit 204 fails to pre-stored the first identification code, the identify unit 203 identifies the first identification code. When identification by the identify unit 203 failed, the identify unit 203 can send the first identification code to the storage unit 204 to be stored and a current number of verification defeated times stored in the storage unit 204 increases one time. The comparison unit 205 can be configured to compare the current number of verification defeated times with the preset number of verification defeated times. When the current number of verification defeated times is larger than the preset number of verification defeated times, the first control unit 206 controls the warning unit 500 to start. When the current number of verification defeated times is less than the preset number of verification defeated times, the identify unit 203 identifies the first identification code again until identifying succeed.

When identification by the identify unit 203 succeed, the first communication unit 201 sends a second identification code to the second identify unit 601. When the second identify unit 601 receives the second identification code, the second control unit 603 can be configured to control the display unit 602 to display characters of "door", "window", "steering wheel", "trunk" and so on. When the character of "door" is pressed, the second communication unit 601 sends a third identification code to the first communication unit 201, and the first control unit 206 controls the driving portion 11 to move the telescopic rod 13 and controls the air pump 55 blow air into the periphery ring 30 via the coupling tube 551, the air guide tube 51, and the branch tubes 53.

When the identify unit 203 judges that the storage unit 204 had pre-stored the first identification code, the comparison unit 205 can be configured to compare the current number of verification defeated times with the preset number of verification defeated times. When the current number of verification defeated times is larger than the preset number of verification defeated times, the first control unit 206 controls the warning unit 500 to start. When the current number of verification defeated times is less than the preset number of verification defeated times, the identify unit 203 identifies the first identification code. When the identification by the identify unit 203 failed, the current number of verification defeated times stored in the storage unit 204 increases one time. The comparison unit 205 can be configured to compare the current number of verification defeated times with the preset number of verification defeated times again. When the current number of verification defeated times is larger than the preset number of verification defeated times, the first control unit 206 controls the warning unit 500 to start. When the current number of verification defeated times is less than the preset number of verification defeated times, the identify unit 203 identifies the first identification code again until identifying succeed.

In at least one embodiment, the first control unit 206 and the second control unit 603 can be a central processing unit, a digital signal processor, or a single chip.

Figure 5:
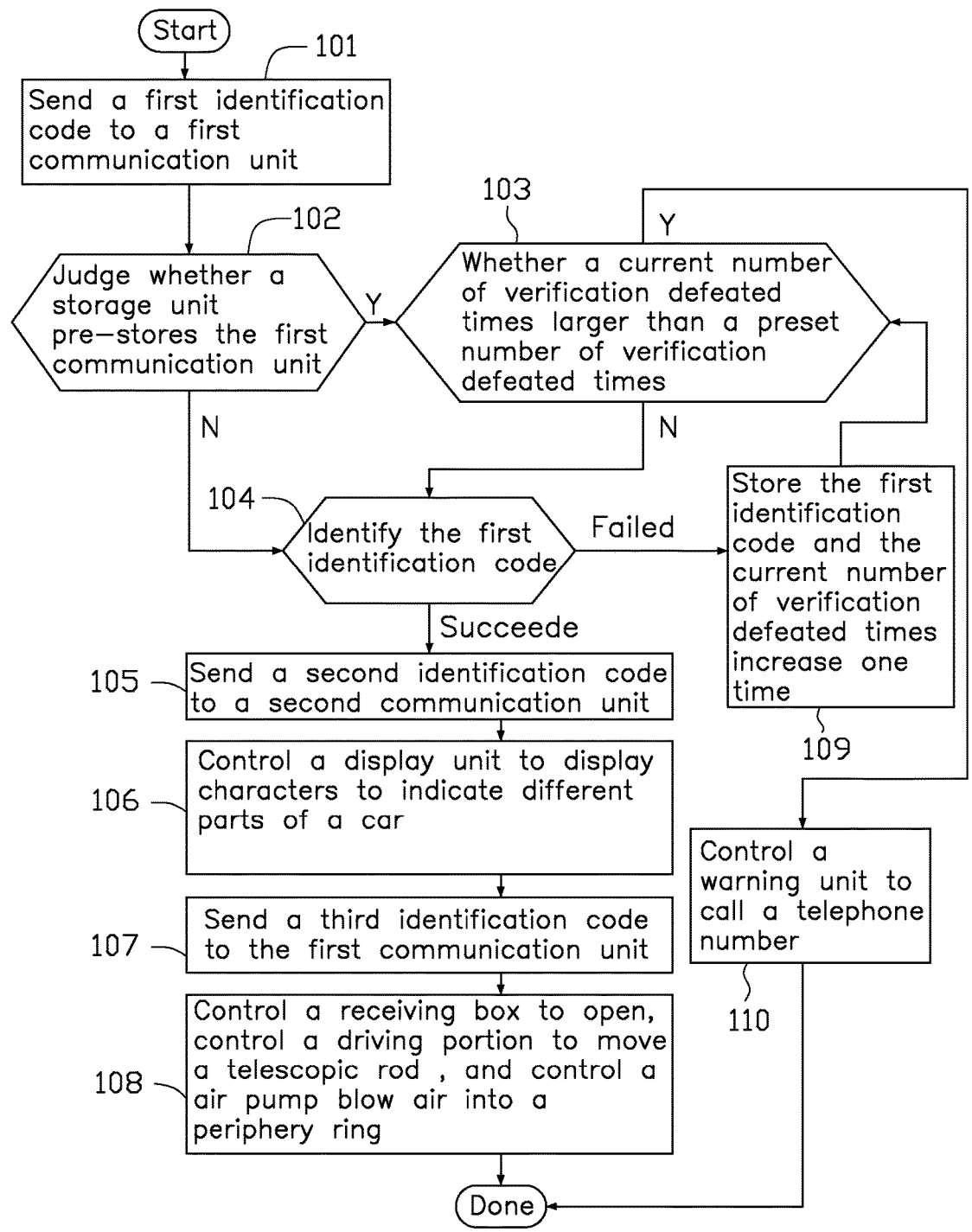
FIG. 5 is a flow chart of a method of unfolding steering wheel.
Figure 6:
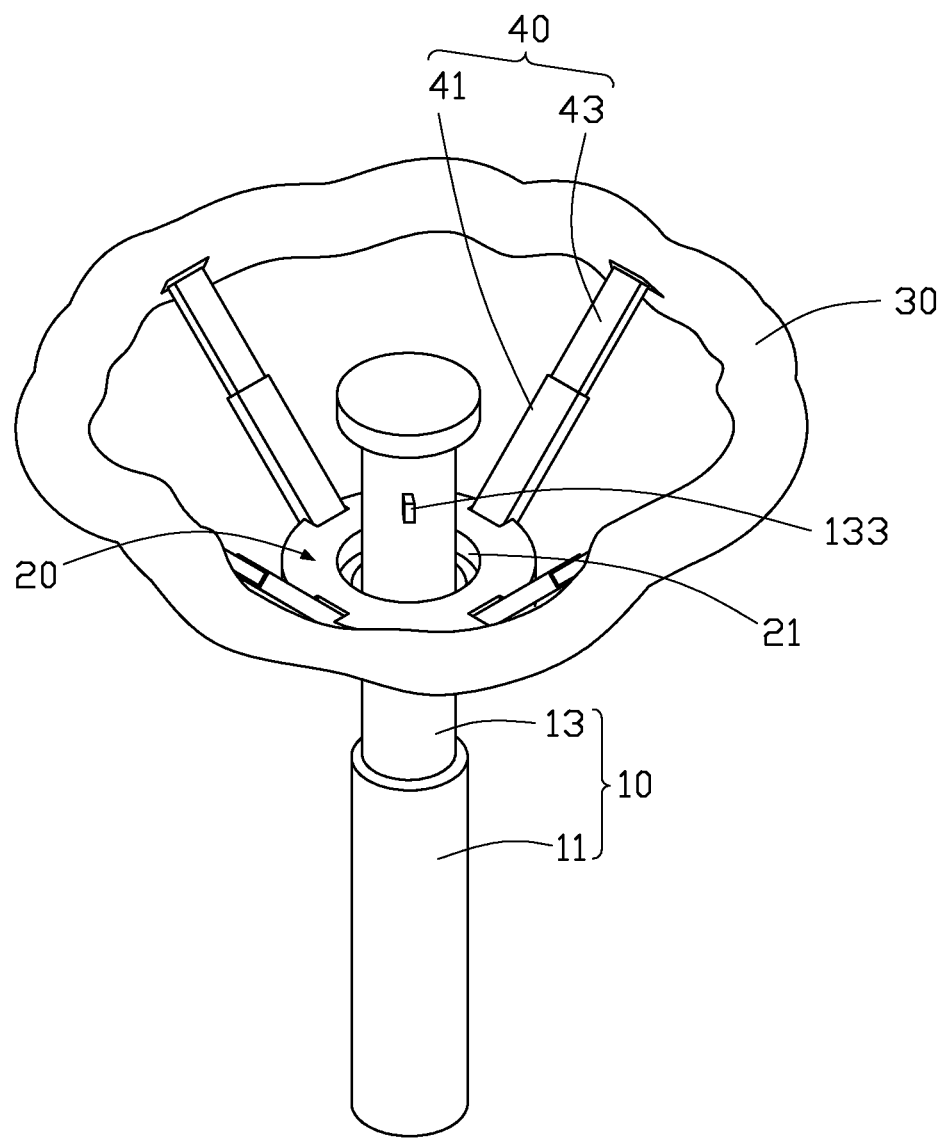
FIG. 6 is an isometric view of the steering wheel except the air pump of FIG. 1, in a second configuration.
Figure 7:
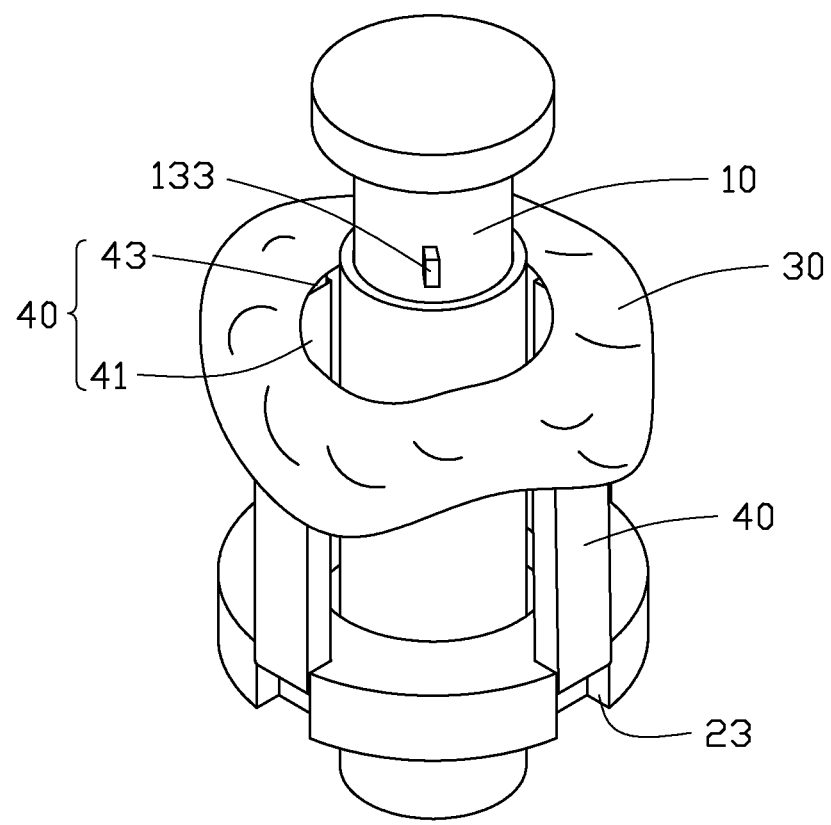
FIG. 7 is an isometric view of the steering wheel except the air pump of FIG. 1, in a third configuration.

FIG. 5 constitutes a flow chart of a method of unfolding the steering wheel. The method of unfolding the steering wheel is provided by way of example, as there are a variety of ways to carry out the method. The control method of unfolding the steering wheel described below can be carried out using the configurations illustrated in FIGS. 1 to 4, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101. FIG. 6 illustrates that the steering wheel 100, in a second configuration, is received in the receiving box 300 before being unfolded. FIG. 7 illustrates that the steering wheel, in a third configuration, in a folded state.

At block 101, the smart key 600 can be carried into a signal receiving range of the control device 200, and the second communication unit 601 can send a first identification code to the first communication unit 201.

At block 102, the identify unit 203 can judge whether the storage unit 204 pre-stores the first identification code. If the storage unit 204 had pre-stored the first identification code, the process goes to block 103. Otherwise, the process goes to block 104.

At block 103, the comparison unit 205 can compare a current number of verification defeated times stored in the storage unit 204 with a preset number of verification defeated times pre-stored in the storage unit 204. If the current number of verification defeated times is larger than the preset number of verification defeated times, the process goes to block 110. If the current number of verification defeated times is less than the preset number of verification defeated times, the process goes to block 104.

At block 104, the identify unit 203 can identify the first identification code. If identification to the first identification code succeed, the process goes to block 105. Otherwise, the process goes to block 109.

At block 105, the first communication unit 201 can send a second identification code to the second communication unit 601.

At block 106, the second control unit 603 can control the display unit 602 to display characters to indicate different parts of a car. The characters can include "door", "window", "steering wheel", "trunk" and so on.

At block 107, the character of "steering wheel" can be pressed or touched, and then the second communication unit 601 sends a third identification code to the first communication unit 201.

Figure 8:
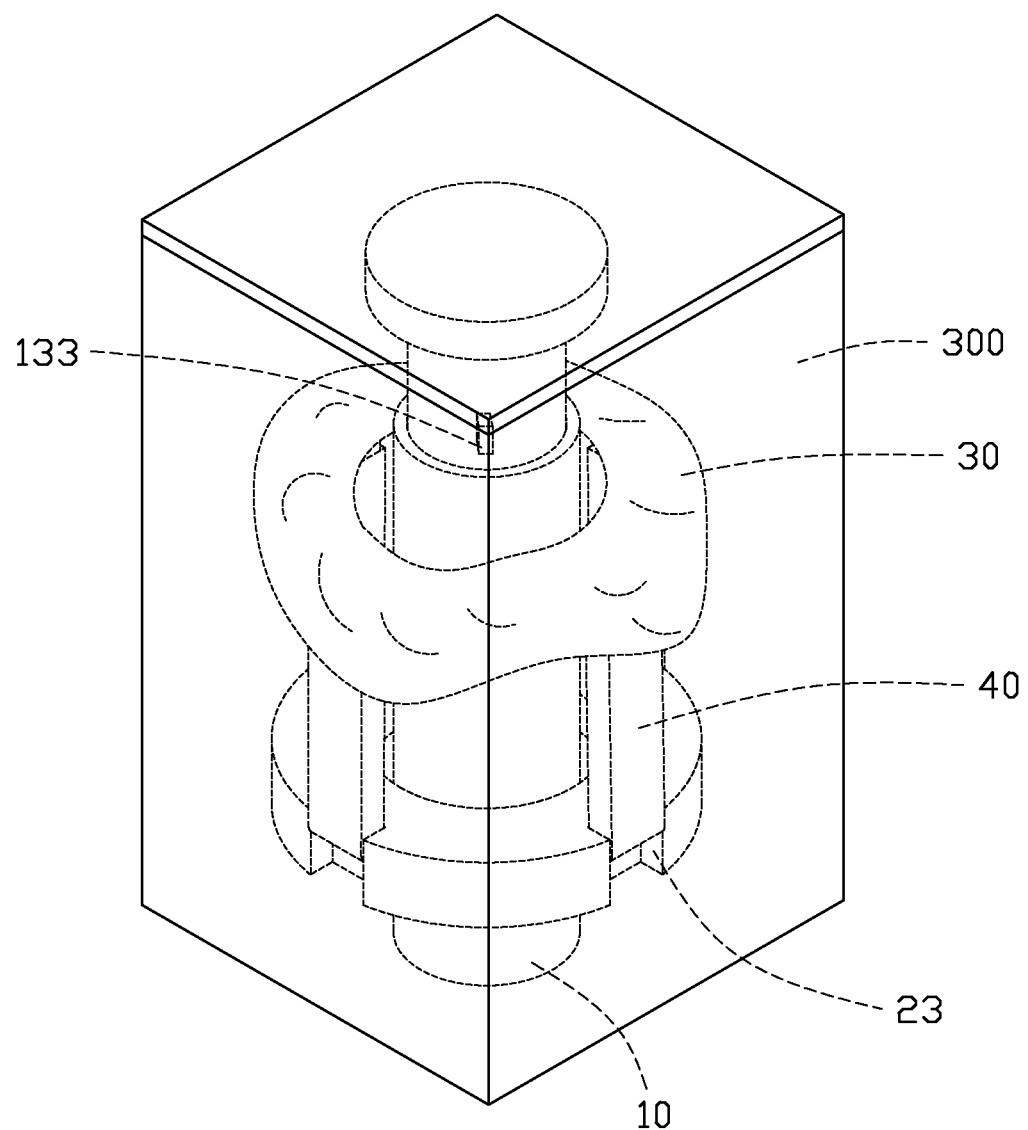
FIG. 8 is an isometric view of the steering wheel except the air pump of FIG. 1, in a fourth configuration.

At block 108, the first control unit 206 can control the receiving box 300 to automatically open, control the driving portion 11 to move the telescopic rod 13, and control the air pump 55 blow air into the periphery ring 30, according to the third identification code received by the first communication unit 201. During inflating the periphery ring 30, the periphery ring 30 can be expanded. Thus, the sliding portions 43 can be pulled from the coupling portions 41. FIG. 8 illustrates the steering wheel, in a fourth configuration, which in a half unfolded state. The arms 40 and rotate and the hub 20 can slide along the rotation shaft 10. When the inflation to the periphery ring 30 is finished, the hub 20 is positioned on the rotation shaft 10 via the latching portion 133.

At block 109, the storage unit 204 can store the first identification code and the current number of verification defeated times can be increased one time.

At block 110, the first control unit 206 can control the warning unit 500 to call the telephone number.

The steering wheel 100 can be semi-automatically folded. Air in the periphery ring 30 can be exhausted by the air pump 55 or can be manually exhausted from an outlet (not shown) of the periphery ring 30. The button 25 can be pressed and the hub 20 can be manually pulled to move along the rotation shaft 10. Thus, the sliding portions 43 can slide into the coupling portions 41. The driving portion 11 can move the telescopic rod 13 to decrease a total length of the driving portion and the telescopic rod 13, thus the steering wheel 100 can be received in the receiving box 300. The receiving box 300 can be manually closed.

Figure 9:
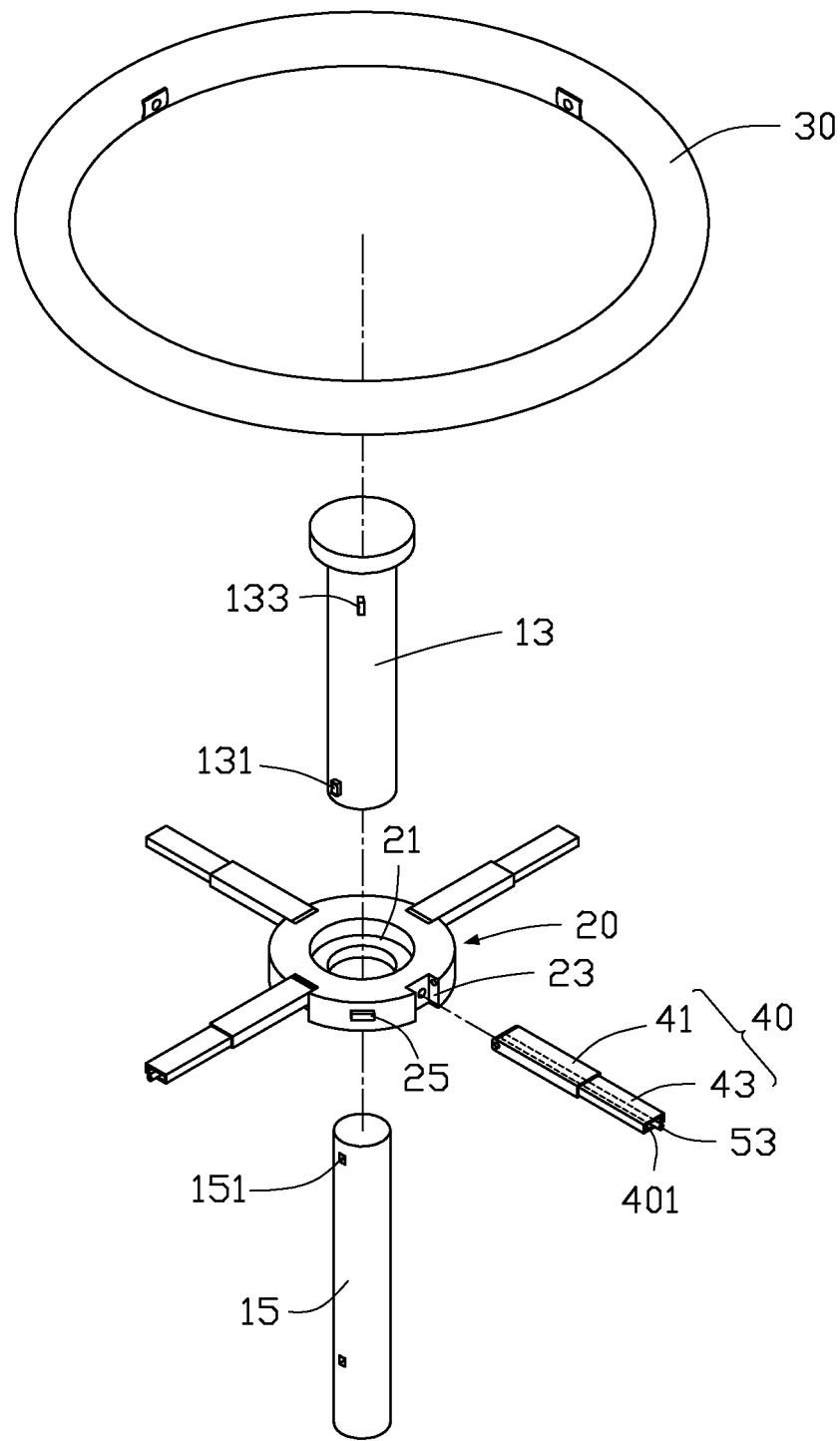
FIG. 9 is an isometric view of a steering wheel, in a fifth configuration.

FIG. 9 illustrates a steering wheel in a fifth configuration. A structure of the steering wheel in the fifth configuration can be substantially similar to a structure of the steering wheel 100 in the first configuration. Differences are illustrated as follows.

The driving portion 11 is replaced by a support rod 15. The telescopic rod 13 can be non-rotatably sleeved on the support rod 15. A mounting portion 131 can be positioned on the telescopic rod 13. Two engaging portions 151 can be respectively coupled to opposite ends of the support rod 15. When the mounting portion 131 is coupled to alternative one of the engaging portions 151, the telescopic rod 13 can be positioned to the support rod 15. In the illustrated configuration, the mounting portion 131 can be a post. The engaging portion 151 can be a hole. In an alternative embodiment, the rotation shaft 10 can include two or more than two telescopic rods 13 coupled one by one.

Figure 10:
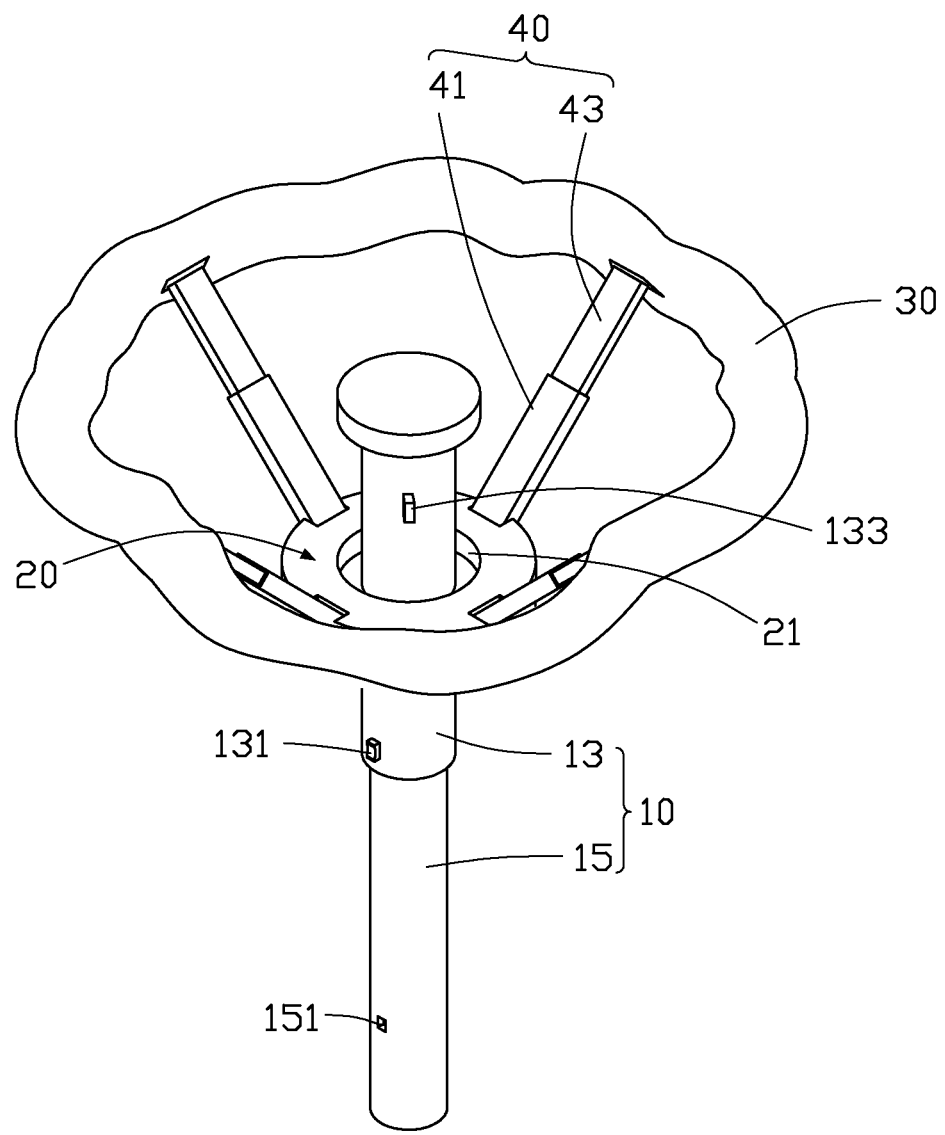
FIG. 10 is an isometric view of the steering wheel of FIG. 9, in a sixth configuration.

When unfolding the steering wheel, the receiving box 300 needs to be manually opened and the telescopic rod 13 needs to be manually pulled. FIG. 10 illustrates that the steering wheel in a sixth configuration. The telescopic rod 13 is pulled and the mounting portion 131 is coupled to a top one of the engaging portion 151. Thus, the sliding portions 43 also can be manually pulled out from the coupling portions 41. Air can be blown into the periphery ring 30 via the branch tubes 53. When the steering wheel needs to be folded, air in the periphery ring 30 can be exhausted and the arms 40 can be folded. The telescopic rod 13 can be manually pulled to move towards the support rod 15. The mounting portion 131 can be coupled to a bottom one of the engaging portions 151.

In an alternative configuration, the air guide tube 51 and the branch tubes 53 can be omitted. Then, air can be blow into the periphery ring 30 via the passages 401 and the annular channel 24. When a length of the coupling portion 41 is less than a height of the receiving box 300, the sliding portion 43 can be omitted. The rotation shaft 10 can be a rod and the driving portion 11 and the telescopic rod 13 can be omitted. The periphery ring 30 can be made of other flexible materials, such as rubber. When the periphery ring 30 is made of anisotropic material, the air pump 55, the passages 401, the annular channels 24 can be omitted. The coupling tube 551 can pass the rotation shaft 10 and communicate with the air guide tube 51.

In an alternative embodiment, the air pump 55 can be in communication with the periphery ring 30 via the coupling tube 551. The coupling tube 551 can be directly in communication with the periphery ring 30. Such as, the periphery ring 30 can define an inlet for receiving the coupling tube 551.

The configurations shown and described above are only examples. Many details are often found in the art such as the other features of a steering wheel. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the configurations described above may be modified within the scope of the claims.

What is claimed is:

1. A steering wheel comprising:
   a rotation shaft coupled to a latching portion;
   a hub slidably sleeved on the rotation shaft;
   a button positioned on the hub and configured to cooperate with the latching portion, the latching portion configured to detachably couple the hub, the button configured to push the latching portion to detach from the hub upon being pressed;
   a periphery ring made of at least one flexible material; and
   at least two arms, the at least two arms pivotably coupled to the hub and coupled to the periphery ring,
   wherein, the at least two arms and the periphery ring are folded in the event the hub slides along the rotation shaft.

2. The steering wheel of claim 1, wherein the hub defines an annular channel therein, each arm defines a passage communicating with the annular channel and the periphery ring, an air pump is in communication with the annular channel via a coupling tube.

3. The steering wheel of claim 2, wherein an air guide tube is received in the annular channel and communicates with the coupling tube, at least one branch tube is received in the passage, the at least one branch tube communicates with the air guide tube and the periphery ring.

4. The steering wheel of claim 1, wherein each arm comprises a coupling portion and a sliding portion coupled to the coupling portion, the coupling portion is pivoted to the hub, the sliding portion is partially received in the coupling portion and coupled to the periphery ring, the sliding portion is configured to slide along a longitudinal direction of the coupling portion.

5. The steering wheel of claim 1, wherein the rotation shaft comprises a support rod and a telescopic rod non-rotatably and slidably sleeved on the support rod, a mounting portion is positioned on the telescopic rod, at least one engaging portion is coupled to the support rod, the mounting portion is configured to detachably couple the at least one engaging portion.

6. The steering wheel of claim 1, wherein the hub defines at least one receiving groove, the at least one arm is partially received in the at least one receiving groove and pivoted to the hub.

7. The steering wheel of claim 1, wherein the rotation shaft comprises a driving portion and a telescopic rod coupled to the driving portion, the driving portion is configured to drive the telescopic rod to move.

8. The steering wheel of claim 1, wherein the periphery ring is made of anisotropic material.

9. A steering wheel control system, comprising:
a control device; and
a steering wheel, comprising:
  a rotation shaft coupled to a latching portion,
  a hub slidably sleeved on the rotation shaft, a button positioned on the hub and configured to cooperate with the latching portion, the latching portion configured to detachably couple the hub, the button configure to push the latching portion to detach from the hub upon being pressed,
  a periphery ring made of at least one flexible material,
  an air pump electrically coupled to the control device and in communication with the periphery ring, and
  at least one arm, the at least one arm pivotably coupled to the hub and coupled to the periphery ring,
  wherein, the control device is configured to control the air pump to blow air into the periphery ring, the at least one arm is configured to be folded in event the hub slides along the rotation shaft.

10. The steering wheel control system of claim 9, wherein the hub defines an annular channel therein, the at least one arm defines a passage communicating with the annular channel and the periphery ring, the air pump is in communication with the annular channel via a coupling tube, the control device is configured to control the air pump to blow air into the periphery ring via the coupling tube, the annular channel, and the passage, thus the hub slides along the rotation shaft during the air pump blowing air into the periphery ring.

11. The steering wheel control system of claim 10, wherein the control device comprises:
  a first communication unit configured to receive a first identification code,
  a storage unit pre-storing a preset number of verification defeated times,
  an identify unit configured to judge whether the storage unit pre-stores the first identification code, and
  a controller,
  wherein, when the identify unit judge that the storage unit had pre-stored the first identification code, the controller compares a current number of verification defeated times with the preset number of verification defeated times,
  wherein, when the current number of verification defeated times is less than the preset number of verification defeated times, the identify unit identifies the first identification code,
  wherein, when identification by the identify unit is succeed, the first communication unit sends a second identification code,
  wherein, when the first communication unit receives a third identification code, the controller controls the air pump to blow air into the periphery ring.

12. The steering wheel control system of claim 9, wherein the at least one arm comprises a coupling portion and a sliding portion coupled to the coupling portion, the coupling portion is pivoted to the hub, the sliding portion is partially received in the coupling portion and coupled to the periphery ring, the sliding portion is configured to slide along a longitudinal direction of the coupling portion.

13. The steering wheel control system of claim 9, wherein the rotation shaft comprises a support rod and a telescopic rod non-rotatably and slidably sleeved on the support rod, a mounting portion is positioned on the telescopic rod, at least one engaging portion is coupled to the support rod, the mounting portion is configured to detachably couple the at least one engaging portion.

14. The steering wheel control system of claim 9, wherein the rotation shaft comprises a driving portion and a telescopic rod coupled to the driving portion, the driving portion is configured to drive the telescopic rod to move.

15. The steering wheel control system of claim 9, wherein the periphery ring is made of anisotropic material.

16. The steering wheel control system of claim 9, wherein the hub defines at least one receiving groove, the at least one arm is partially received in the at least one receiving groove and pivoted to the hub.

17. A steering wheel comprising:
a rotation shaft coupled to a latching portion;
a hub slidably sleeved on the rotation shaft;
a button positioned on the hub and configured to cooperate with the latching portion, the latching portion configured to detachably couple the hub, the button configured to push the latching portion to detach from the hub upon being pressed;
a periphery ring made of at least one flexible material; and
at least one arm, the at least one arm pivotably coupled to the hub and coupled to the periphery ring,
wherein, the at least one arm is configured to be folded in the event the hub slides along the rotation shaft;
wherein the at least one arm comprises a coupling portion and a sliding portion coupled to the coupling portion, the coupling portion is pivoted to the hub, the sliding portion is partially received in the coupling portion and coupled to the periphery ring, the sliding portion is configured to slide along a longitudinal direction of the coupling portion.

* * * * *